United States Patent [19]

Dickinson, Jr.

[11] Patent Number: 5,798,306
[45] Date of Patent: Aug. 25, 1998

[54] RARE EARTH DOPED OXYHALIDE LASER GLASS

[75] Inventor: James Edward Dickinson, Jr., Corning, N.Y.

[73] Assignee: Corning Incorporated, Corning, N.Y.

[21] Appl. No.: 835,899

[22] Filed: Apr. 14, 1997

Related U.S. Application Data

[60] Provisional application No. 60/015,801 Apr. 17, 1996.

[51] Int. Cl.$^6$ .............................. H01S 3/17; C03C 3/112; C09K 11/186
[52] U.S. Cl. .............................. 501/57; 501/56; 501/70; 252/301.4 F; 252/301.4 R; 252/301.4 H; 372/40
[58] Field of Search ...................... 372/40; 252/301.4 F, 252/301.4 H, 301.4 R; 501/56, 57, 70, 43

[56] References Cited

U.S. PATENT DOCUMENTS

| | | | |
|---|---|---|---|
| 4,142,986 | 3/1979 | Rapp | 372/40 |
| 4,959,837 | 9/1990 | Fevrier et al. | 372/6 |
| 4,962,067 | 10/1990 | Myers | 501/45 |
| 4,962,995 | 10/1990 | Andrews et al. | 350/96.34 |
| 5,114,453 | 5/1992 | Ross et al. | 65/30.13 |
| 5,134,626 | 7/1992 | Oda et al. | 372/72 |
| 5,200,029 | 4/1993 | Bruce et al. | 156/657 |
| 5,262,365 | 11/1993 | Oyobe et al. | 501/54 |
| 5,338,607 | 8/1994 | Kawamoto et al. | 428/373 |
| 5,351,335 | 9/1994 | Ohishi et al. | 385/142 |
| 5,475,528 | 12/1995 | LaBorde | 359/341 |
| 5,655,046 | 8/1997 | Todoroki et al. | 385/144 |

OTHER PUBLICATIONS

Miniscalco, "Erbium–Doped Glasses for Fiber Amplifiers at 1500 nm", J. Lightwave Tech.; vol. 9, No. 2, pp. 234–250, Feb. 1991.

"Spectroscopic Investigations of the ER3+ Fluorescence Transitions at 540 nm and 1.5 m in Fluoride Phosphase and Phosphate Glasses", Glastechnische Berichte, vol. 66, No. 9, Sep. 1, 1993, pp. 235–244.

"CW Room Temperature Upconversion Lasing in ER3+–Doped Fluoride Glass Fiber", Journal of Non–Crystalline Solids, vol. 143, No. 1, May 2, 1992, pp. 40–45.

"Photoluminescence Properties of ER3+–Doped (NAP03)6–BACL2–ZNCL2–RCK Glasses", Materials Letters, vol. 13, No. 6, May 1, 1992, pp. 299–305.

"Absorption and Emission Spectra of HO3+ Doped Fluoroborate Glasses", Physics and Chemistry of Glasses, vol. 37, No. 1, Feb. 1, 1996, pp. 41–43.

Patent Abstracts of Japan, vol. 096, No. 012, Dec. 26, 1996 & JP 08 198637 A (Nippon Telegr & Amp; Teleph Corp & LT; NTT & GT;), Aug. 6, 1996.

"Erbium–Doped Glass for Fiber Amplifiers at 1500 nm", William J. Miniscalco, Journal of Lightwave Technology, vol. 9, No. 2, Feb. 1991, pp. 234–250.

"Science and Technology of Laser Glass", M.J. Weber, Journal of Non–Crystalline Solids 123 (1990), Elsevier Science Publishers B.V. (North–Holland), pp. 208–222.

(List continued on next page.)

*Primary Examiner*—Melissa Bonner
*Attorney, Agent, or Firm*—Edward F. Murphy

[57] ABSTRACT

The oxyhalide rare earth doped laser glass of the present invention comprises the substitution of fluorine for oxygen in glasses having the general molar batch composition of 50% $SiO_2$, 25% CaO, 25% $Al_2O_3$ to improve the distribution of rare earth dopants in the glass. The general molar batch composition of the invention ranges from approximately 45–70% $SiO_2$, 15–35% CaO, 10–25% $Al_2O_3$, 4–15% $Al_2F_6$, and 0.001–2% $Er_2O_3$. This substitution of fluorine into the $2SiO_2 \cdot Al_2O_3 \cdot CaO$ glass system provides erbium doped laser glasses having a $Er_2O_3$ batch content of 0.01 mole % $Er_2O_3$ to 1.2 mole % $Er_2O_3$ (500 ppm $Er_2O_3$ to 5.68 wt. % $Er_2O_3$) which show little to no concentration quenching and exhibit useful fluorescence lifetimes of approximately 6 milliseconds (ms) or greater.

22 Claims, 3 Drawing Sheets

OTHER PUBLICATIONS

"A Review of the Fabrication and Properties of Erbium–Doped Fibers for Optical Amplifiers", B. James Ainslie, Journal of Lightwave Technology, vol. 9, No. 2, Feb. 1991, pp. 220–227.

"Aluminum of phosphorus co-doping effects on the fluorescence and structural properties of neodymium–doped silica glass", J. Appl. Phys. 59 (10), May 15, 1986, American Institute of Physics, pp. 3430–3436.

"Luminescence quenching by OH groups in highly Er–doped phosphate glasses", Yingchao Yan, Anne Jans Faber, Henk de Waal, Journal of Non–Crystalline Solids 181 (1995) pp. 283–290.

1

RARE EARTH DOPED OXYHALIDE LASER GLASS

This application claims the benefit of U.S. provisional application No. 60/015,801, filed Apr. 17, 1996.

FIELD OF THE INVENTION

This invention relates to oxyhalide laser glasses doped with rare earth elements.

BACKGROUND OF THE INVENTION

It is known in the prior art that laser glasses may be produced by doping silica glass with rare earth elements. The laser property of such rare earth doped laser glasses is derived from the light amplification achieved by stimulated emission of the excited rare earth element ions doped in the glass and is dependent on the fluorescence lifetime of the doped ions. It is further known that the laser output of a laser glass is dependent on the number of rare earth ions present in the glass.

The problem in the prior art has been that a maximum usable concentration of rare earth ions in a laser glass is quickly reached due to the phenomenon of concentration quenching. Concentration quenching is due to the non-radiative decay of excited rare earth ions which are too close to their neighboring unexcited rare earth ions. Excited rare earth ions will transfer energy to closely neighboring non-excited rare earth ions through dipole-dipole coupling, resulting in no net output of light. As the concentration of rare earth ions in a laser glass is increased, the rare earth ions tend to cluster close together with neighboring rare earth ions, consequently an increase in actual excitable rare earth ions responsible for the laser output is not achieved, and the fluorescence lifetime of the rare earth ions is reduced.

The problem faced by the prior art has been to provide a glass composition which may be doped to a relatively high rare earth ion concentration without ion clustering reducing the fluorescence lifetime of the rare earth ions.

Presently erbium is a popular rare earth element used in doping laser glasses, since erbium doped laser glasses can effectively amplify the 1.55 μm wavelength of light used in optical telecommunication systems. Neodymium is also used as a rare earth dopant in laser glasses. Accordingly, it is the object of the present invention to provide a laser glass that overcomes the problems of the prior art.

SUMMARY OF THE INVENTION

It is, therefore, an object of the present invention to provide a glass composition having a relatively high concentration of excitable erbium ions resistant to clustering which can be advantageously used in laser applications such as planar optical amplifiers and other compact laser products which require a high concentration of excitable ions over a short path length.

Briefly, the present invention relates to an oxyhalide glass composition which allows for an increased rare earth dopant concentration without the detrimental effects of concentration quenching.

In another aspect, the invention relates to an oxyhalide laser glass composition which advantageously disperses erbium ions to prevent dipole-dipole coupling and provide long fluorescence lifetimes.

In still another aspect, the invention relates to an oxyfluoride alumina silicate laser glass.

In a further aspect, the invention relates to an oxyfluoride laser glass having a fluorine content sufficient to inhibit the detrimental effects of concentration quenching.

2

A further objective of the present invention is to disclose a method of inhibiting concentration quenching of rare earth dopants in an oxide glass.

The inventive composition provides an oxyhalide glass with an increased erbium ion concentration without the detrimental effects of concentration quenching. The invention's oxyhalide glass composition provides a glass chemistry structure which advantageously disperses erbium ions away from neighboring erbium ions so as to prevent the dipole-dipole coupling of concentration quenching which occurs when erbium ions are located too close together. The inventive composition maximizes total erbium concentration in the glass while also maximizing the distance between neighboring erbium ions. The inventive composition allows for relatively high erbium concentrations while providing useful fluorescence lifetimes.

The inventive oxyfluoride laser glass comprises the substitution of fluorine for oxygen in alumina silicate glasses. The distribution of erbium dopant in the glass is improved by replacing a percentage of the $Al_2O_3$ in the general molar batch composition of $2SiO_2 \cdot Al_2O_3 \cdot CaO$ with $Al_2F_6$. The general molar batch composition of the invention ranges from approximately 45–70% $SiO_2$, 15–35% CaO, 10–25% $Al_2O_3$, 4–15% $Al_2F_6$, and 0.001–2% $Er_2O_3$. The inventive batch compositions are melted and formed under conditions to provide an oxyfluoride glass having at least 6 wt. % F.

DESCRIPTION OF THE INVENTION

The inventive oxyhalide glass comprises the substitution of fluorine for oxygen in glasses having the general molar batch composition of 50% $SiO_2$, 25% CaO, 25% $Al_2O_3$ with approximately 11 mole % of the $Al_2O_3$ batched as $Al_2F_6$ to improve the distribution of erbium doped in the glass. The general molar batch composition of the invention ranges from approximately 45–70% $SiO_2$, 15–35% CaO, 10–25% $Al_2O_3$, 4–15% $Al_2F_6$, and 0.001–2% $Er_2O_3$. With this substitution of fluorine into the $2SiO_2 \cdot Al_2O_3 \cdot CaO$ glass system, the inventor has produced erbium doped laser glasses having a $Er_2O_3$ batch content of 0.01 mole % $Er_2O_3$ to 1.2 mole % $Er_2O_3$ (500 ppm $Er_2O_3$ to 5.68 wt. % $Er_2O_3$) which show little to no concentration quenching and exhibit useful fluorescence lifetimes of approximately 6 milliseconds (ms) or greater.

The batch compositions of the invention and comparison samples were melted in covered platinum crucibles for approximately 6 hours at approximately 1600° C. and then poured onto steel plates to form glass bricks measuring 4"×4"×½", which were subsequently annealed at 550° C. Glass testing samples were taken from these glass bricks by scoring and breaking, and then the fluorescence lifetime of the samples were measured in milliseconds (ms) to determine the laser properties of the glass.

Fluorine batch composition ranges of 5 to 11 mole % of $Al_2F_6$ (7–15 wt. % F) are particularly preferred for such glass forming conditions. Fluorine retention rates for the melts of the invention vary from 50 to 80% depending on the initial fluorine concentration and melting temperature. For example, if 30 wt. % F is batched, about 15 wt. % F is actually analyzed in the glass after melting. If 10 wt. % F is batched, about 7 wt. % F is analyzed in the glass after melting. The percentage of F retained in the glass increases with a decreased melt temperature.

The general weight percentage batch compositions of the invention are:

30–45 wt. % $SiO_2$,

25–45 wt. % $Al_2O_3$,

10–25 wt. % CaO, 0.005–10 wt. % $Er_2O_3$, and

7–35 wt. % F (batched as $Al_2F_6$) with an analyzed fluorine weight percent after melting of 6.2–20 wt. % F.

The preferred weight percentage batch compositions of the invention are:

37–40 wt. % $SiO_2$,

30–40 wt. % $Al_2O_3$,

15–19 wt. % CaO, 0.005–6 wt. % $Er_2O_3$, and

9–30 wt. % F (batched as $Al_2F_6$) with an analyzed fluorine weight percent after melting of 6.5–15 wt. % F.

Table 1 discloses batched weight % compositions of the invention as embodied in samples 1–10. Table 1 also discloses the analyzed weight % of fluorine (F) present in the glass after melting and formation of samples 2, 4, 5, 6, 7, 8, 9 and 10.

Figure 1:
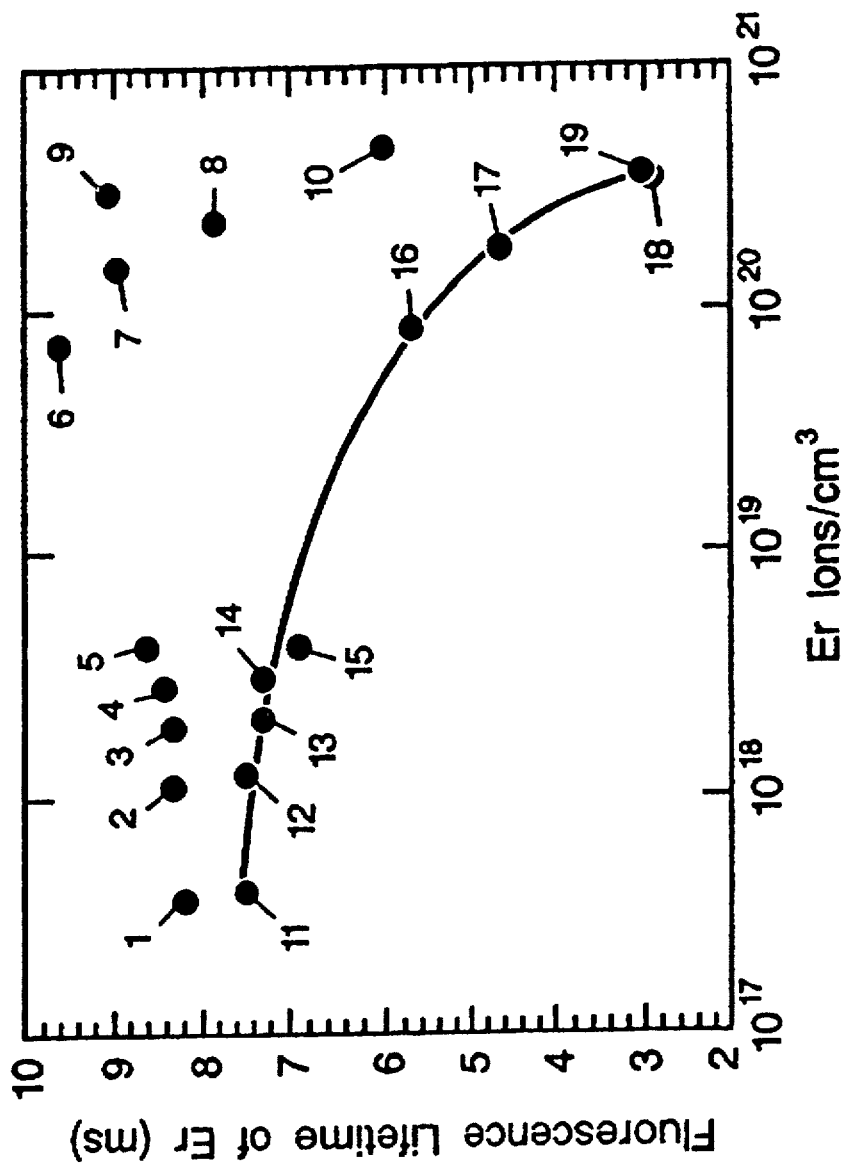
FIG. 1 is a plot of fluorescence lifetime versus Erbium ion concentration.

Table 1 includes the batched weight % compositions of non-fluorine comparison samples 11, 12, 13, 14, 15, 16, 17, and 19 which were manufactured and compared to the fluorine containing glasses of the invention.

lifetimes of the erbium ions of samples 1–19 in milliseconds (ms) versus the erbium dopant density of samples 1–19 in erbium ions per $cm^3$. FIG. 1 clearly shows the superior fluorescence lifetime performance of the invention as compared to the non-fluorine containing samples outlined by the curve from sample 11 to sample 19. As shown in FIG. 1, as the erbium weight % is increased from 0.0055 wt. % $Er_2O_3$ in sample 11 to 4.21 wt. % $Er_2O_3$ in sample 19 (less than $10^{18}$ to greater than $10^{20}$ Er ions/$cm^3$), the fluorescence lifetime declines exponentially from 7.5 ms to 3 ms. Over this same range of erbium concentration, the fluorine containing samples of the invention have markedly improved lifetimes. The inventive composition allows for erbium dopant densities greater than $10^{20}$ ions/$cm^3$ while maintaining useful fluorescence lifetimes of 6 ms and greater. With the inventive composition, as the erbium concentration is increased from sample 1 (0.005 wt. % $Er_2O_3$ batched) to sample 6 (0.995 wt. % $Er_2O_3$ batched), the fluorescence lifetime continues to climb. As the erbium dopant increases beyond $10^{20}$ ion/$cm^3$, the fluorescence lifetime levels off in the 8 to 9 msec range and then declines to 6 msec with sample 10. The 6 msec lifetime of sample 10 is a utilizable level, especially considering the high erbium concentration. A comparison of sample 18 (4.05 wt. % $Er_2O_3$ batched, 6.7 wt. % F batched, and 4.9 wt. % F analyzed) with samples 8, 9, and 10 discloses that the 4.9 wt. % F analyzed in sample 18 is not sufficient to inhibit concentration quenching at such high erbium densities.

Figure 2:
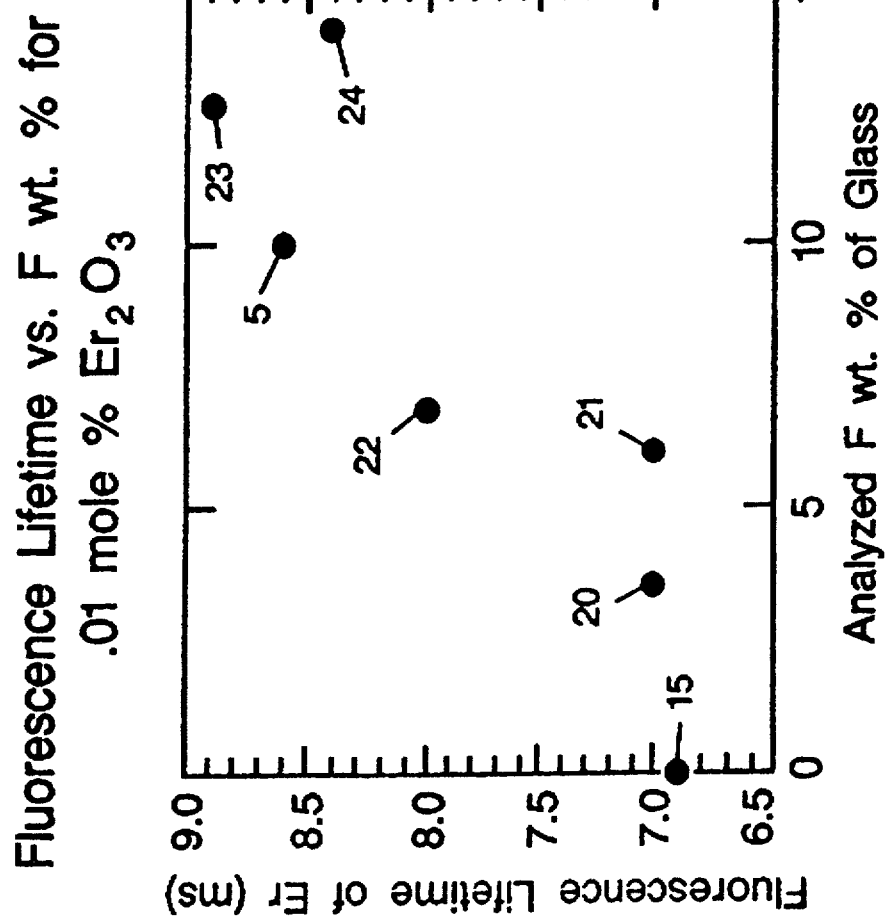
FIG. 2 is a plot of fluorescence lifetime versus the analyzed Fluorine weight percent of glasses doped with 0.01 mole percent of $Er_2O_3$.

Table 2 and the plot of FIG. 2 show the relationship of fluorine content analyzed in the glass after formation to the increased fluorescence lifetimes of the invention and the invention's ability to inhibit concentration quenching. Table 2 presents the weight % batch compositions of samples 20–24 along with samples 15 and 5 from Table 1, all of which have a 0.01 mole % $Er_2O_3$ batch composition. FIG. 2 clearly shows the relationship of the fluorine content of the glass to their fluorescence lifetime.

TABLE 1

Weight % Compositions of Samples 1–19

|  | 1 | 2 | 3 | 4 | 5 | 6 | 7 | 8 | 9 | 10 |
|---|---|---|---|---|---|---|---|---|---|---|
| $SiO_2$ | 39.4 | 39.4 | 39.4 | 39.4 | 39.4 | 39.1 | 38.7 | 38.3 | 37.9 | 37.2 |
| $Al_2O_3$ | 33.5 | 33.5 | 33.5 | 33.5 | 33.5 | 33.1 | 32.8 | 32.5 | 32.2 | 31.6 |
| CaO | 18.4 | 18.4 | 18.4 | 18.4 | 18.4 | 18.2 | 18.0 | 17.9 | 17.7 | 17.4 |
| $Er_2O_3$ | .0050 | .0151 | .0251 | .0377 | .0502 | .995 | 1.97 | 2.93 | 3.86 | 5.68 |
| F(Batch) | 14.7 | 14.6 | 14.6 | 14.6 | 14.6 | 14.5 | 14.4 | 14.2 | 14.1 | 13.8 |
| F(Anal.) |  | 7.1 |  | 7.7 | 10.2 | 8.4 | 8.3 | 6.7 | 7.4 | 7.5 |

|  | 11 | 12 | 13 | 14 | 15 | 16 | 17 | 18 | 19 |
|---|---|---|---|---|---|---|---|---|---|
| $SiO_2$ | 43.1 | 43.1 | 43.1 | 43.1 | 43.1 | 42.7 | 42.2 | 39.7 | 41.3 |
| $Al_2O_3$ | 36.6 | 36.6 | 36.6 | 36.6 | 36.6 | 36.2 | 35.8 | 33.7 | 35.1 |
| CaO | 20.1 | 20.1 | 20.1 | 20.1 | 20.1 | 19.9 | 19.7 | 18.5 | 19.3 |
| $Er_2O_3$ | .0055 | .0165 | .0275 | .0412 | .0549 | 1.09 | 2.15 | 4.05 | 4.21 |
| F(Batch) | 0 | 0 | 0 | 0 | 0 | 0 | 0 | 6.7 | 0 |
| F(Anal.) |  |  |  |  |  |  |  | 4.9 |  |

The fluorescence lifetimes of samples 1–19 were measured by exciting the samples with an Argon ion laser beam (514 nm). Fluorescent radiation from the samples was detected with a Ge photodiode and fluorescent lifetimes were computed therefrom. FIG. 1 presents the fluorescence

TABLE 2

| Weight % Compositions Having .01 Mole % Er$_2$O$_3$ | | | | | | | |
|---|---|---|---|---|---|---|---|
| | 15 | 20 | 21 | 22 | 5 | 23 | 24 |
| SiO$_2$ | 43.1 | 42.0 | 41.4 | 39.7 | 39.4 | 36.8 | 35.6 |
| Al$_2$O$_3$ | 36.6 | 35.7 | 35.1 | 39.1 | 33.5 | 31.3 | 30.2 |
| CaO | 20.1 | 19.6 | 19.3 | 15.6 | 18.4 | 17.2 | 16.6 |
| Er$_2$O$_3$ | .0549 | .0535 | .0527 | .0506 | .0502 | .0469 | .0453 |
| F(Batch) | 0 | 4.26 | 6.98 | 9.38 | 14.6 | 24.9 | 30 |
| F(Anal.) | | 3.61 | 6.17 | 7.04 | 10.2 | 12.8 | 14.2 |

As the analyzed wt. % F of the 0.01 mole % Er$_2$O$_3$ batch compositions are raised from sample 15 which has no F to sample 21 with 6.17 wt. % F the fluorescence lifetime remains stable and in the 6.8–7 ms range. Then with an increase of approximately 1 wt. % F, the fluorescence lifetime of sample 22 jumps up to 8 ms. Increased lifetimes are further achieved with the increased wt. % F of samples 5, 23, and 24. This threshold wt. % F between 6 and 7% correlates with the fluorine content threshold between sample 18's 4.9 wt. % F and sample 8's 6.7 wt. % F.

The inventive composition inhibits concentration quenching of the erbium ions by providing a glass chemistry structure wherein the erbium ions are advantageously distributed apart from one another. The fluorine content of the inventive composition allows for an increased concentration of erbium ion while providing useful fluorescence lifetimes.

Figure 3:
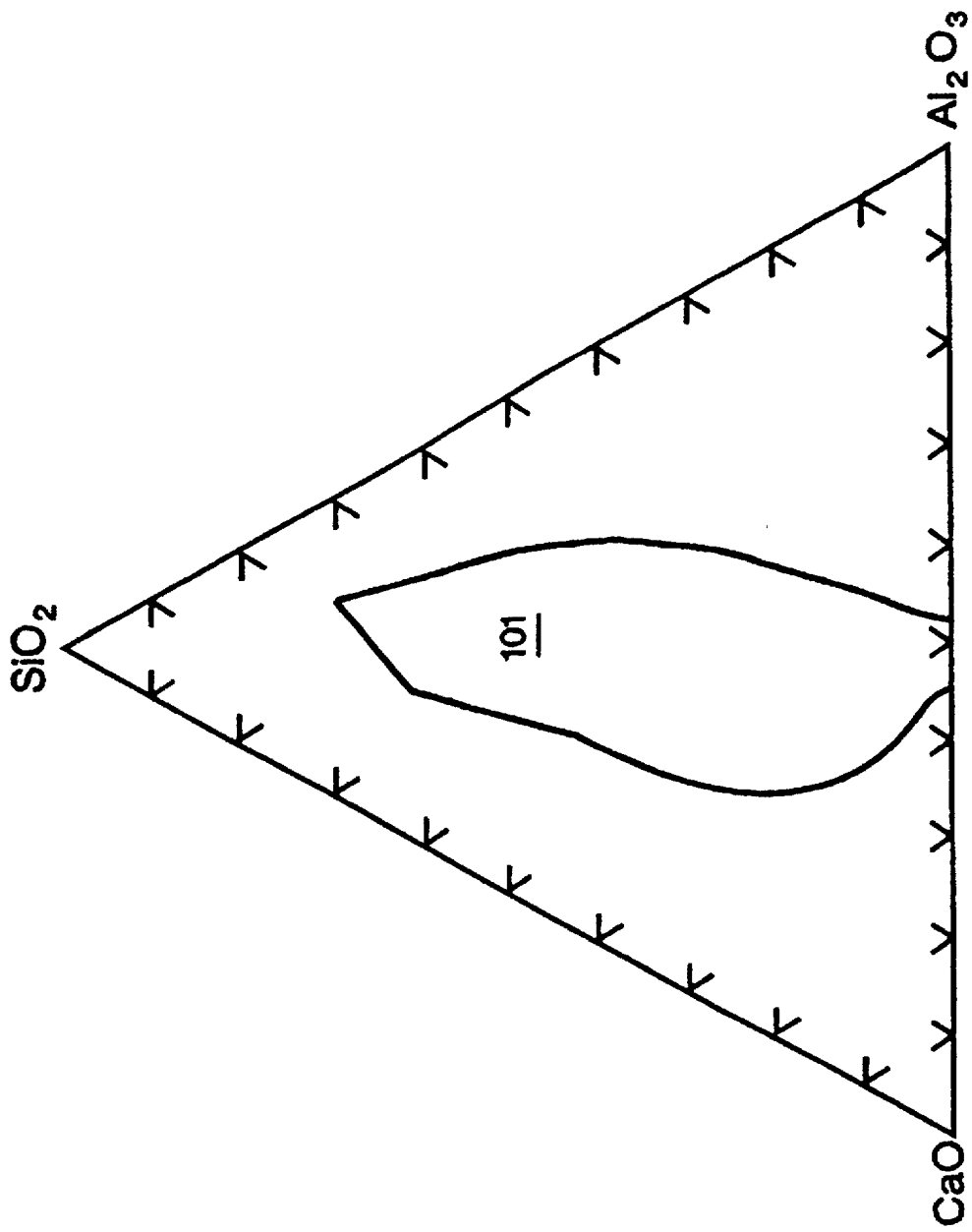
FIG. 3 is a compositional weight percent diagram of the invention.

As illustrated in the Compositional Weight Percent Diagram of FIG. 3, the general oxide glass composition area 101 of the invention correlates with the general stoichiometry of the anorthite (CaO.Al2O$_3$. 2SiO$_2$) and gehienite (2CaO.Al$_2$O$_3$.SiO$_2$) crystalline phases, with the addition of erbium and fluorine to provide laser characteristics having adequate fluorescent lifetimes.

The inventor has produced erbium doped oxyfluoride alumina silicate glasses by the substitution of CaO in the batch compositions with ZnO, alkaline and alkaline earth oxides such as MgO, BaO and Na$_2$O. Such glass compositions incorporating the benefits of the invention's fluorine content to suppress concentration quenching of the rare earth ions should exhibit similar laser properties.

The inventive glass compositions further include the substitution of Al$_2$O$_3$ in the batch compositions with Ga$_2$O$_3$. Al$_2$O$_3$ can be totally substituted in the batch composition with gallium. The inventive glass batch composition can include from 0–25 mole percent Ga$_2$O$_3$.

The inventive glass compositions further include the substitution of SiO$_2$ in the batch compositions with GeO$_2$. SiO$_2$ can be totally substituted in the batch composition with germanium. The inventive glass batch composition can include from 0–50 mole percent GeO$_2$.

The inventive glass composition further includes the substitution of Al$_2$O$_3$ in the batch composition with B$_2$O$_3$. Aluminum can be substituted in the batch composition with boron. The inventive glass batch composition can include from 0–15 mole percent B$_2$O$_3$.

In addition to the embodiments discussed above, it will be clear to persons skilled in the art that numerous modifications and changes can be made to the above invention without departing from its intended spirit and scope.

I claim:

1. An erbium doped aluminum silicon calcium oxyfluoride laser glass, said glass having a fluorescence lifetime of at least approximately 6 msec, wherein said glass contains 0.005–6 wt. % Er$_2$O$_3$ and 6.2–20 wt. % F.

2. A laser glass as claimed in claim 1, wherein said glass has a concentration of at least 1×10$^{17}$ erbium ions/cm$^3$.

3. A laser glass as claimed in claim 1, wherein said glass has a concentration of at least 1×10$^{20}$ erbium ions/cm$^3$.

4. A rare earth doped laser glass, said laser glass having a molar batch composition comprised of
   45–70 mole % SiO$_2$;
   15–35 mole % CaO;
   10–25 mole % Al$_2$O$_3$;
   4–15 mole % Al$_2$F$_6$;
   0.001–2 mole % Er$_2$O$_3$.

5. A laser glass as claimed in claim 4, wherein said laser glass has a concentration of at least 1×10$^{17}$ erbium ions/cm$^3$.

6. A laser glass as claimed in claim 4, wherein said glass has a concentration of at least 1×10$^{20}$ erbium ions/cm$^3$.

7. A laser glass as claimed in claim 4, wherein said glass contains 6.2–20 wt. % F.

8. A laser glass as claimed in claim 4, wherein said laser glass exhibits a fluorescence lifetime of at least 6 milliseconds.

9. A laser glass having a weight % batch composition comprising:
   30–45 wt. % SiO$_2$;
   25–45 wt. % Al$_2$O$_3$;
   10–25 wt. % CaO;
   0.005–10 wt. % Er$_2$O$_3$; and
   7–35 wt. % F, batched as Al$_2$F$_6$
wherein said glass has an analyzed content of at least 6.2–20 wt. % F.

10. A laser glass as claimed in claim 9, wherein wherein said laser glass exhibits a fluorescence lifetime of at least 6 milliseconds.

11. A laser glass having a weight % batch composition consisting essentially of:
   37–40 wt. % SiO$_2$;
   30–40 wt. % Al$_2$O$_3$;
   15–19 wt. % CaO,
   0.005–6 wt. % Er$_2$O$_3$; and
   9–30 wt. % F, batched as Al$_2$F$_6$
wherein said glass has an analyzed content of at least 6.5–15 wt. % F.

12. An aluminum silicon oxyhalide laser glass containing a divalent oxide and doped with a plurality of erbium ions, said erbium ions are contained in a concentration of at least 1×10$^{17}$ ions/cm$^3$, said glass having an analyzed fluorine wt. % content of 6.2–20 wt. % fluorine wherein said glass exhibits a fluorescence lifetime of at least 7.6 ms.

13. A laser glass as claimed in claim 12, wherein said erbium ions are contained in a concentration of at least 1×10$^{20}$ ions/cm$^3$.

14. An erbium doped aluminum silicon oxyfluoride laser glass, which contains a divalent oxide and 0.005–10 wt. %

$Er_2O_3$ and 6.2–20 wt. % F, wherein said glass exhibits a fluorescence lifetime of at least 6 ms.

15. A laser glass as claimed in claim 14, wherein said divalent oxide is CaO.

16. An optical amplifier formed from an erbium doped oxyfluoiride laser glass having a weight % batch composition comprised of 30–45 wt. % $SiO_2$, 25–45 wt. % $Al_2O_3$, 10–25 wt. % CaO, 0.005–10 wt. % $Er_2O_3$, wherein said glass has an analyzed content of 6.2–20 wt. % F.

17. A method of inhibiting concentration quenching of a rare earth dopant in a laser glass, said method comprises the steps of providing an erbium silicate laser glass having a batch composition of $MO_2$, $M^1$, $M^2{}_2O_3$ and $Er_2O_3$, where M is Si or Ge, $M^1$ is an oxide of Zn, an alkali metal or an alkaline earth metal, and $M^2$ is Al, Ga, or B, and substituting an oxygen ion in the laser glass with a fluorine ion by replacing a part of an oxide in the batch composition with a fluoride.

18. A rare earth doped laser glass, said laser glass having a molar batch composition consisting essentially of:

0.001–2 mole % $Er_2O_3$;
45–70 mole % $MO_2$;
15–35 mole % $M^1$;
10–25 mole % $M^2{}_2O_3$;
4–15 mole % $Al_2F_6$ wherein M is Si or Ge; and $M^1$ is an oxide of Zn, an alkali metal or an alkaline earth metal; and $M^2$ is Al, Ga, or B.

19. A rare earth doped laser glass, said laser glass having a molar batch composition comprised of:

45–70 mole % $MO_2$;
15–35 mole % $M^1$;
10–25 mole % $M^2{}_2O_3$;
4–15 mole % $Al_2F_6$;
0.001–2 mole % $Er_2O_3$ wherein M is Si or Ge; and $M^1$ is an oxide of Zn, an alkali metal or an alkaline earth metal; and and $M^2$ is Al, Ga; or B.

20. A laser glass as claimed in claim 19 wherein the glass contains 6.2–20 wt. % F.

21. A laser glass as claimed in claim 19 wherein said laser glass exhibits a fluorescence lifetime of at least 6 milliseconds.

22. A method as claimed in claim 17 wherein replacing a part of an oxide in the batch composition with a fluoride comprises replacing $Al_2O_3$ with $Al_2F_6$.

* * * * *